(12) United States Patent
Hohnl et al.

(10) Patent No.: US 6,945,505 B2
(45) Date of Patent: Sep. 20, 2005

(54) SEAT MOUNT ASSEMBLIES FOR TRACTORS

(75) Inventors: Gary David Hohnl, Slinger, WI (US); Brian Thomas Mallaney, Rock Hill, SC (US); Michael Ray McClain, Fort Mill, SC (US); Dimitri Nunez, Waxhaw, NC (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 10/198,949

(22) Filed: Jul. 19, 2002

(65) Prior Publication Data

US 2004/0011939 A1 Jan. 22, 2004

(51) Int. Cl.7 .............................................. F16M 13/00
(52) U.S. Cl. ..................................... 248/424; 248/429
(58) Field of Search .............................. 248/424, 429, 248/298.1, 636

(56) References Cited

U.S. PATENT DOCUMENTS

| | | | |
|---|---|---|---|
| 1,969,353 A | * 8/1934 | Chapman | 248/429 |
| 2,636,545 A | 4/1953 | Johnson | 155/14 |
| 2,678,681 A | 5/1954 | Haltenberger | 155/14 |
| 3,841,696 A | 10/1974 | Wagner | 296/65 R |
| 4,168,051 A | * 9/1979 | Terada | 248/429 |
| 4,477,050 A | 10/1984 | Thompson et al. | 248/636 |
| 4,549,765 A | 10/1985 | Hoch | 297/311 |
| 4,730,804 A | 3/1988 | Higuchi et al. | 248/429 |
| 4,874,051 A | * 10/1989 | Borchard | 177/229 |
| 4,930,593 A | 6/1990 | Swartzendraber et al. | 180/89.17 |
| 4,993,679 A | 2/1991 | Urai et al. | 248/429 |
| 5,037,155 A | 8/1991 | Holm et al. | 296/65.1 |
| 5,133,588 A | 7/1992 | Hutchinson et al. | 297/217 |
| 5,171,055 A | 12/1992 | Hutchison et al. | 296/65.1 |
| 5,286,076 A | * 2/1994 | DeVoss et al. | 296/65.14 |
| 5,876,085 A | 3/1999 | Hill | 296/65.02 |
| 5,918,847 A | 7/1999 | Couasnon | 248/430 |
| 6,010,194 A | * 1/2000 | Cykon | 297/440.22 |
| 6,036,157 A | 3/2000 | Baroin et al. | 248/429 |
| 6,186,467 B1 | 2/2001 | Wahls | 248/564 |
| 6,227,596 B1 | * 5/2001 | Foucault et al. | 296/65.13 |
| 6,254,188 B1 | 7/2001 | Downey | 297/341 |
| 6,318,802 B1 | * 11/2001 | Sjostrom et al. | 297/344.1 |
| 6,354,553 B1 | * 3/2002 | Lagerweij et al. | 248/430 |

OTHER PUBLICATIONS

MartINsite, Inland Steel Company, Jan. 25, 2001.
Castelgarden tractorsfrom www.doylesgroup.com printed on Nov. 8, 2002.

* cited by examiner

Primary Examiner—Leslie A. Braun
Assistant Examiner—A. Joseph Wujciak, III
(74) Attorney, Agent, or Firm—Bell, Boyd & Lloyd, LLC

(57) ABSTRACT

The present invention relates to a seat mount assembly for a vehicle having a seat, such as a tractor. The seat mount assembly, in one embodiment, includes a seat support, one or more seat securing members connected to the seat and movably engaged with the seat support and at least one seat adjust handle. The seat mount assembly enables users to conveniently change the seat position while remaining seated.

34 Claims, 8 Drawing Sheets

SEAT MOUNT ASSEMBLIES FOR TRACTORS

BACKGROUND OF THE INVENTION

The present invention generally relates to seat mount assemblies. More specifically, the present invention relates to seat mount assemblies for tractors which enable users to adjust the seat position.

The typical tractor has an adjustable seat to accommodate the different sizes and needs of users. Some known seats require the user to get off of the seat in order to adjust the seat. Once off of the seat, the user must turn knobs or use tools in order to adjust the seat position. A significant disadvantage with these seats is inconvenience.

Other known seats are adjustable while the user is remaining on the seat. The adjustment mechanisms for these types of seats are relatively complex. These mechanisms include a relatively high number of parts, such as wireforms, coil springs, rails and/or ball bearings. Due to this complexity, these seat adjustment mechanisms have several disadvantages. They malfunction relatively frequently, require a relatively high amount of maintenance services and are relatively expensive to manufacture.

Therefore, there is a need to overcome these disadvantages.

SUMMARY OF THE INVENTION

The present invention generally relates to tractors. More specifically, the present invention relates to seat mount assemblies for tractors which enable users to adjust the seat position while remaining seated. The seat mount assembly generally serves as a mount which supports the tractor seat. In one embodiment, without including any coil springs, bearing tracks or bearings, the seat mount assembly enables the user to adjust the seat position while remaining seated without the use of any adjustment tools. Here, the seat mount assembly includes: (a) a seat mount or seat support which provides support for the seat; (b) a plurality of seat securing members which connect the seat to the seat support in a slidable fashion; and (c) a unitary springback seat adjust handle connected to the seat which removeably engages the seat support.

Preferably the seat mount assembly defines a cavity which enables the seat securing members to slide relative to the seat support. It is also preferable that the seat support includes a plurality of guide slot walls for receiving the seat securing members. The seat support preferably includes a plurality of aligned, equally spaced engaging members adapted to mate with the seat support engaging members of the seat adjust handle.

The seat adjust handle is preferably a metallic strip having a spring property. Due to the spring property, the seat adjust handle applies a force to the seat support after the user releases the seat adjust handle. When the user pulls the seat adjust handle off of the seat support and then releases the seat adjust handle, the seat adjust handle returns to its substantially original position abutting the seat support.

The seat mount assembly of the present invention provides a reliable, relatively low maintenance assembly for adjusting the seat position while the user remains seated. The seat mount assembly is operable with the user's hands, requiring no tools. With a relatively high degree of convenience, the user can move the seat forward or backward simply by pulling and releasing a flexible seat adjust handle.

It is therefore an advantage of the present invention to provide seat mount assemblies for tractors and other vehicles.

Another advantage of the present invention is to increase the convenience of adjusting the seat position of tractors and other vehicles.

Yet another advantage of the present invention is to increase the reliability of seat adjustment devices for tractors and other vehicles.

Still another advantage of the present invention is to decrease the maintenance required by seat adjustment devices for tractors and other vehicles.

Additional features and advantages of the present invention are described in, and will be apparent from, the following Detailed Description of the Invention and the figures.

DETAILED DESCRIPTION OF THE INVENTION

Figure 1:
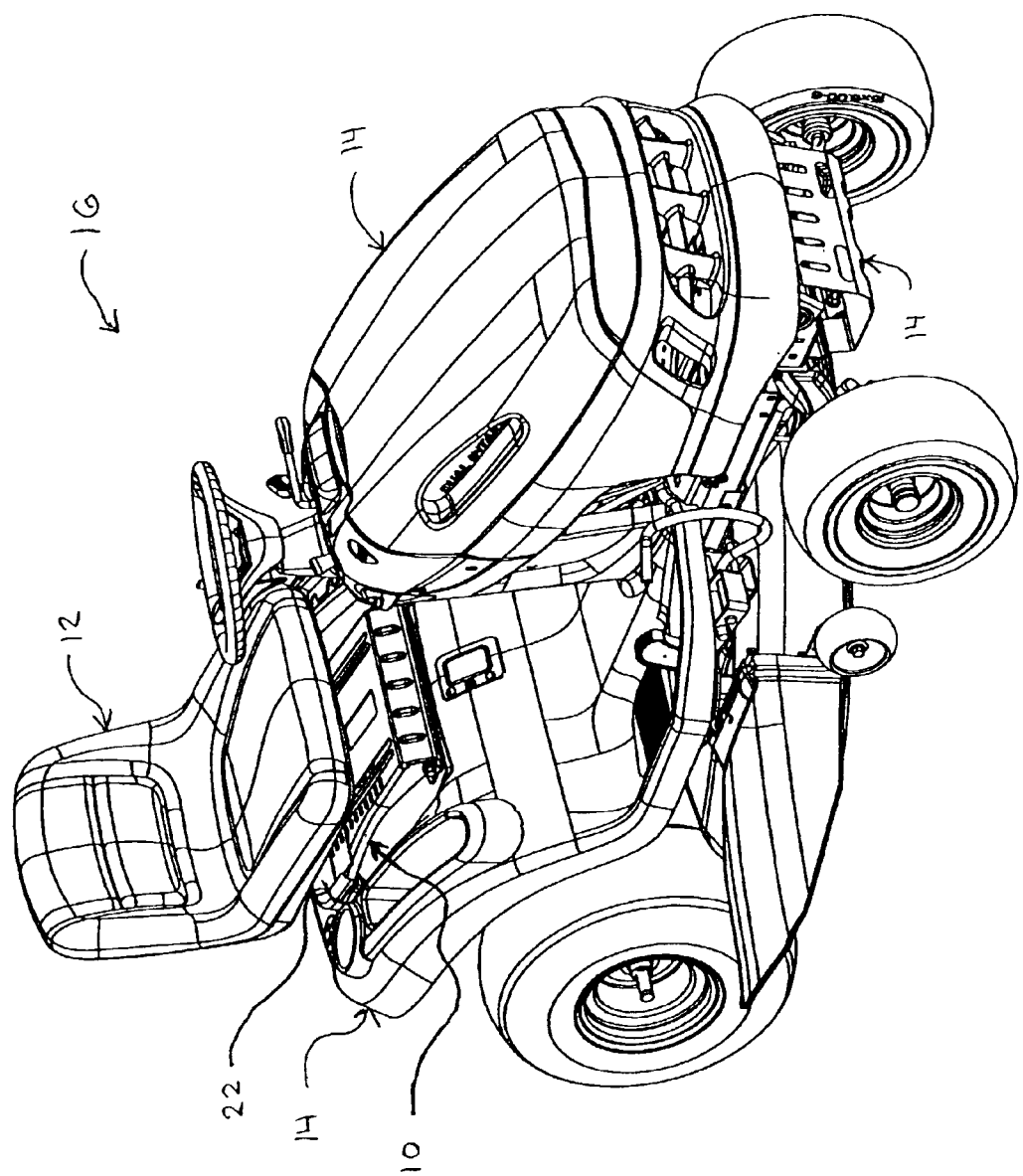
FIG. 1 is an elevated side perspective view of the tractor and the seat mount assembly in one embodiment of the present invention.

Referring now to the drawings, FIGS. 1 to 8 illustrate the seat mount assembly 10 in one embodiment of the present invention. The seat mount assembly 10 generally serves as a mount which connects the seat 12 to the tractor frame 14 of a tractor 16. The seat mount assembly 10 includes: (a) a seat mount or seat support 18 which provides support for the seat 12; (b) a plurality of seat securing members 20 which connect the seat 12 to the seat support 18 in a slidable fashion as described below; and (c) a seat adjust handle 22 connected to the seat 12 which removeably engages with the seat support 18 as described below.

Figure 2:
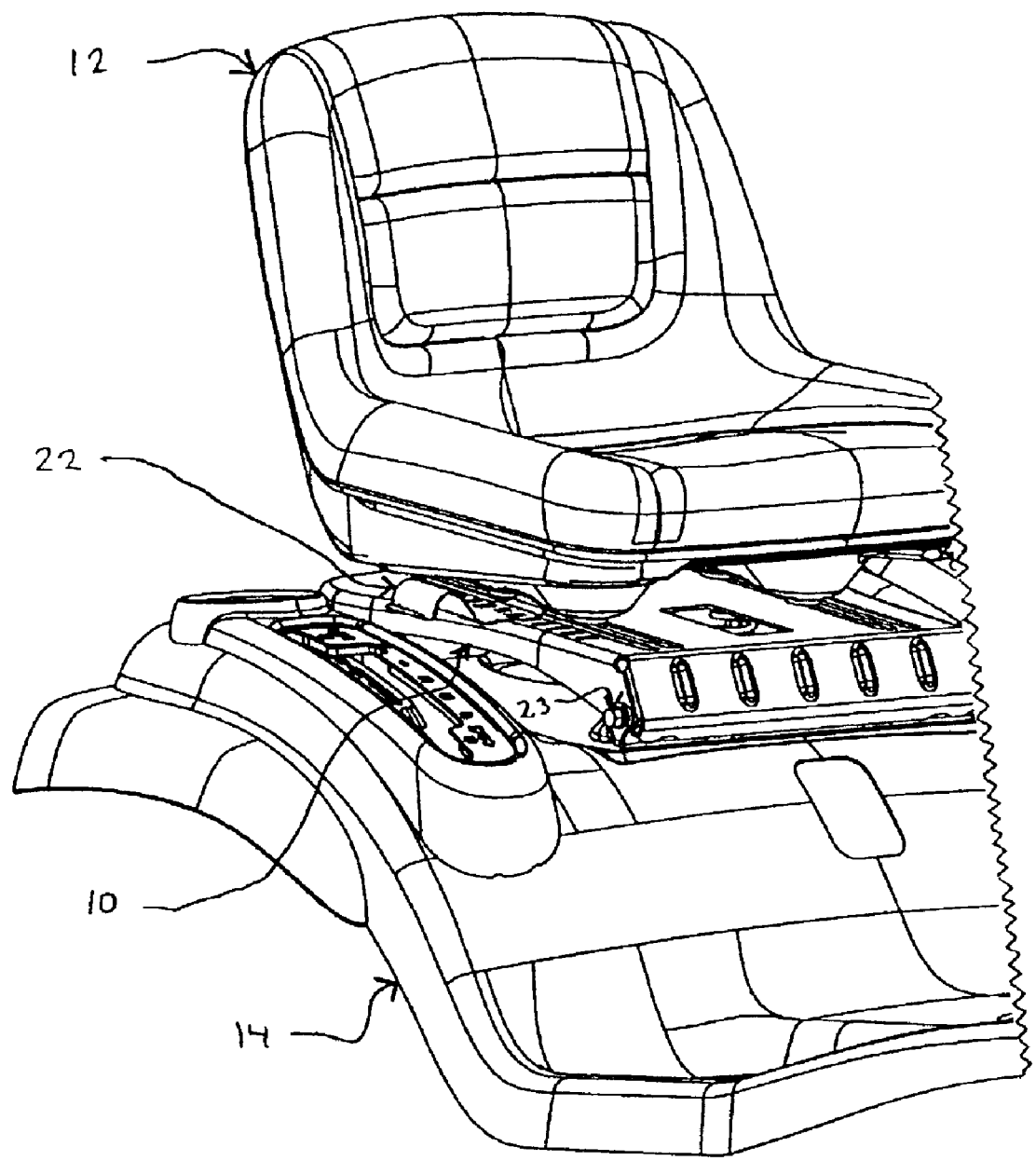
FIG. 2 is a fragmentary elevated side perspective view of the tractor and the seat mount assembly in one embodiment of the present invention.
Figure 3:
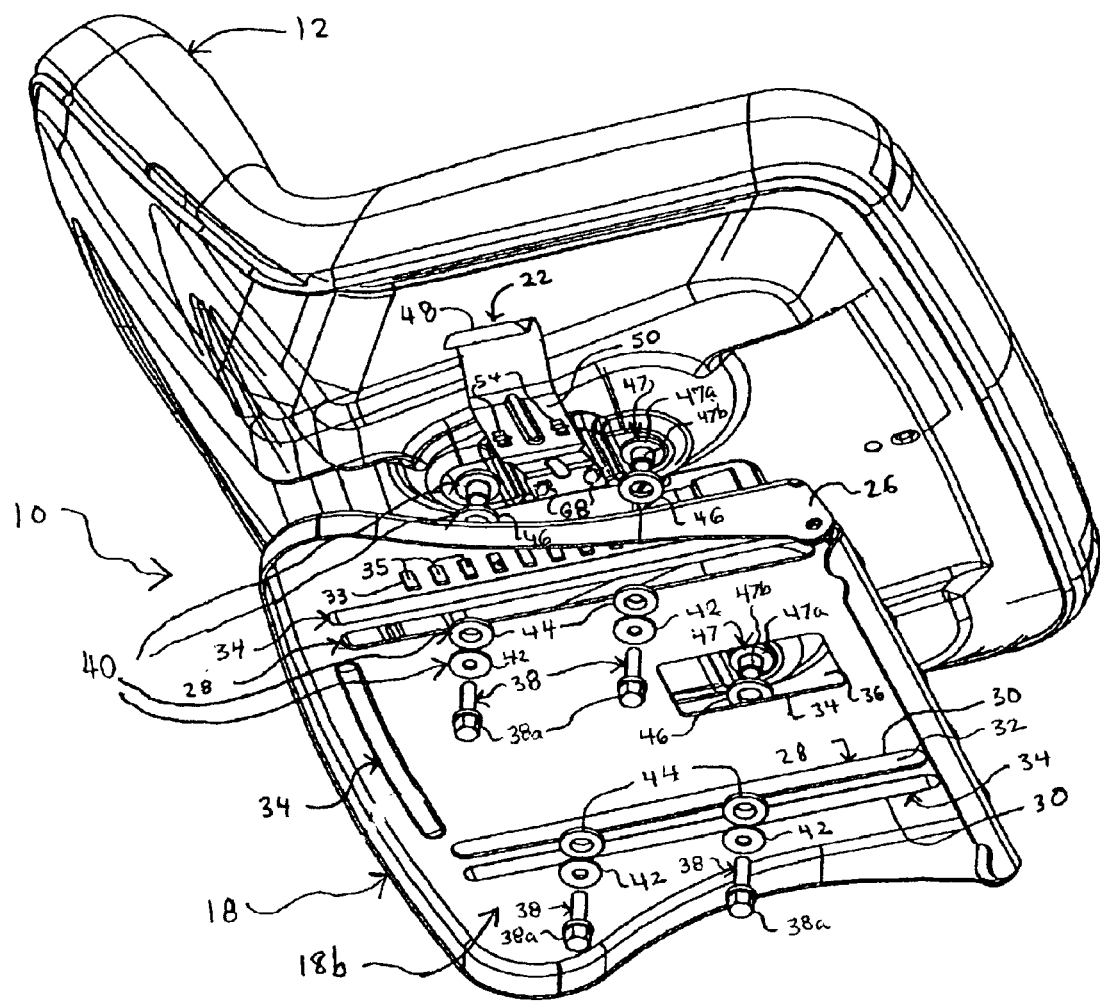
FIG. 3 is a bottom perspective view of the chair and seat mount assembly in one embodiment of the present invention.
Figure 4:
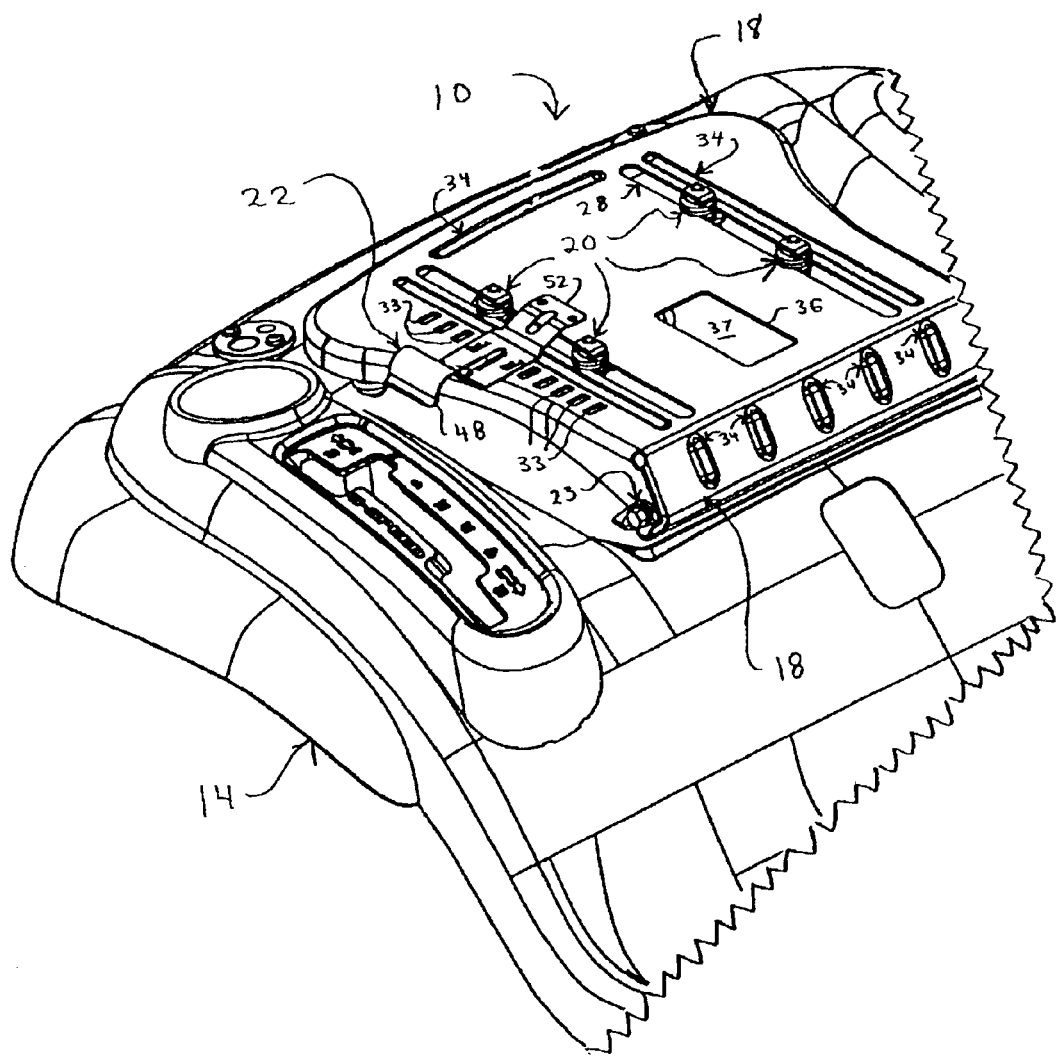
FIG. 4 is a fragmentary top perspective view of the tractor and the seat mount assembly in one embodiment of the present invention.
Figure 5:
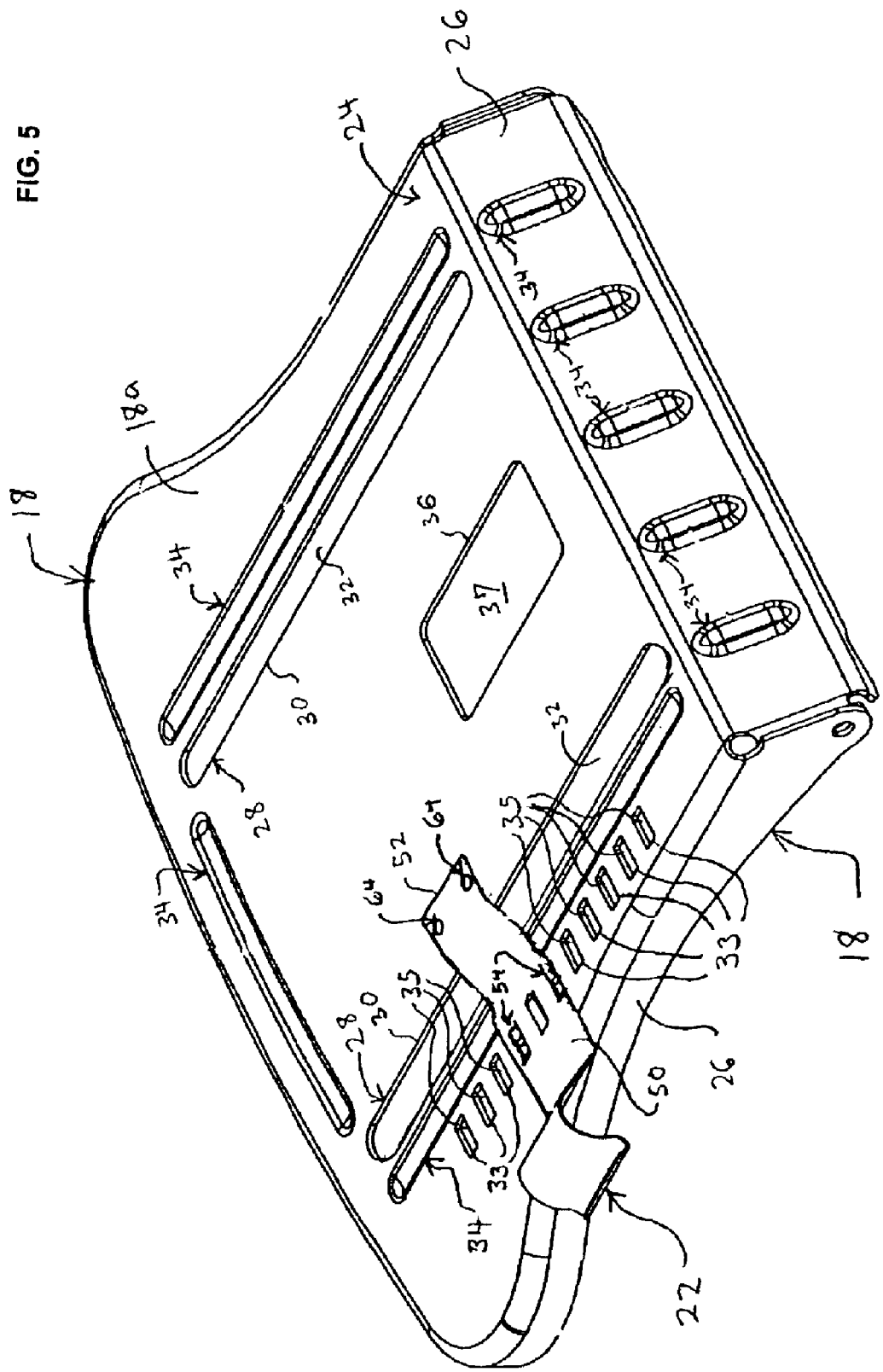
FIG. 5 is a top perspective view of the seat support and seat adjust handle in one embodiment of the present invention.

The seat support 18 can be connected to the tractor frame 14 in any suitable fashion. Preferably, a plurality of fasteners 23 (such as shoulder bolts), one of which is shown in FIGS. 2 and 4, pivotally connect the seat support 18 to the tractor frame 14. The seat support 18 defines a cavity or open space which enables the seat securing members 20 to freely slide as described below. It is preferable that the seat support 18 includes a body 24 and a plurality of legs 26 connected to the body 24. Preferably, the seat support 18 is formed of a suitable metallic material, such as sheet metal. The seat support 18 can have any suitable configuration, such as a pan-shaped or polygon-shaped configuration. It is also preferable that the legs 26 are walls which extend downward from the body 24 around substantially the entire perimeter of the body 24. It should be appreciated, however, that the legs 26 can be separate bar members extending downward from the body 24.

The body 24 includes a plurality of guides 28 which guide and define the sliding movement of the seat securing members 20. Each guide 28 includes a slot wall 30 which defines an opening or slot 32 of a select length. In addition, the seat support 18 includes a plurality of reinforcement or stiffening members 34, preferably ribs, which provide stiffness and rigidity to the seat support 18. Also, the body 24 of the seat support 18 preferably includes a slot wall 36 which defines a seat access slot 37. The seat access slot 37 enables an assembly person or installer to access the seat 12 for connecting electrical wires to the seat 12 or for any other seat installation purpose.

The seat support 18 also includes one or more, and preferably a plurality of engaging members 33 which engage with the seat support engaging member 54 as described below. It is preferable that the engaging members 33 are slot walls which define a plurality of slots 35 for receiving the seat support engaging member 54. The slots 35 can have any suitable configuration, including, but not limited to, a rectangular, C-shape or any other suitable shape. The slots 35 are preferably positioned on the seat support 18 adjacent to one of the guides 28. It is preferable that the slots 35 are arranged in a uniformly spaced, sequential array. For example, the slots 35 can be arranged in a line formation or linear array, a circular or semi-circular formation or any other suitable formation where each slot 35 is separated from the other slot 35 by substantially the same distance.

Each guide 28 defines a forward limit and a backward limit for the sliding movement of the seat securing members 20 within the guide 28. Each seat securing member 20 can include any suitable member or fastener connected to the seat 12 which slidably engaging the slot walls 30 of the guides 28. Preferably, each seat securing member 20 includes a bolt 38 which extends through a plurality of female parts 40 and is screwably connected to the seat 12. In the embodiment illustrated, the bolt 38 extends through a washer or retaining member 42. It should be appreciated that the retaining member 42 can be joined with and integrated into the bolt head 38a. In any case, the bolt 38 then extends through a bottom friction reducing member 44, such as a plastic washer. The bolt 38 then extends through the slot 32 and then through a top friction reducing member 46. The bottom and top friction reducing members 44 and 46 straddle the slot wall 30 to facilitate the sliding of the seat securing members 20 within the guides 28.

The bolt 38 then extends through a spacer guard member 47, such as a powder metal bushing. The spacer guard member 47 preferably includes: (a) a cylindrical wall 47a which is open ended on both sides for receiving the bolt 38; and (b) a support member 47b, such as a shoulder, which provides support for the secure engagement of the bolt 38 to the seat 12. The cylindrical wall 37a has a select outer diameter which is less than the size of the slot 32. Accordingly, the cylindrical wall 37a extends into the slot 32 when the bolt 38 is tightened to the seat 12.

When the bolt 38 is fully screwed into the seat 12, the cylindrical wall 37a makes contact with the bolt head 38a. The cylindrical wall 37a has a select length which provides the parts 40 with the necessary space to enable the seat securing member 22 to slide within the slot 32. In addition, the cylindrical wall 37a guards and protects the bolt 38 during the sliding process.

It should be appreciated that the present invention can include any suitable seat support and seat securing member. For example, in one alternative embodiment, the guides of the seat support can include one or more rails or tracks, and the seat securing members can include one or more bearings which roll in such tracks. In another alternative embodiment, the present invention can include a single seat securing member which engages a suitable guide of the seat support. Such a seat securing member can enable the user to rotate the seat 12 about the axis of the seat securing member 20. It should also be appreciated that, in addition to backward and forward guides, the present invention can include side-to-side guides (not shown) for adjusting the seat position laterally.

It should also be appreciated that, instead of including separable seat securing members, the seat securing members can be incorporated into a seat frame which supports the seat cushion. For example, the seat frame can include one or more studs, rigidly connected to the seat frame, which slidably engage with the seat support.

Furthermore, it should be appreciated that, in one alternative embodiment not shown, the seat support can be part of the seat. For example, the seat support can function as a seat frame which supports the seat cushion. In this case, the seat support 18 illustrated in FIGS. 3 to 5 could be inverted, and the seat support legs 26 could be adapted to directly connected to the seat 12. Accordingly, the guides 28 could be adapted to engage with mating members which extend upward from the tractor frame.

Figure 6:
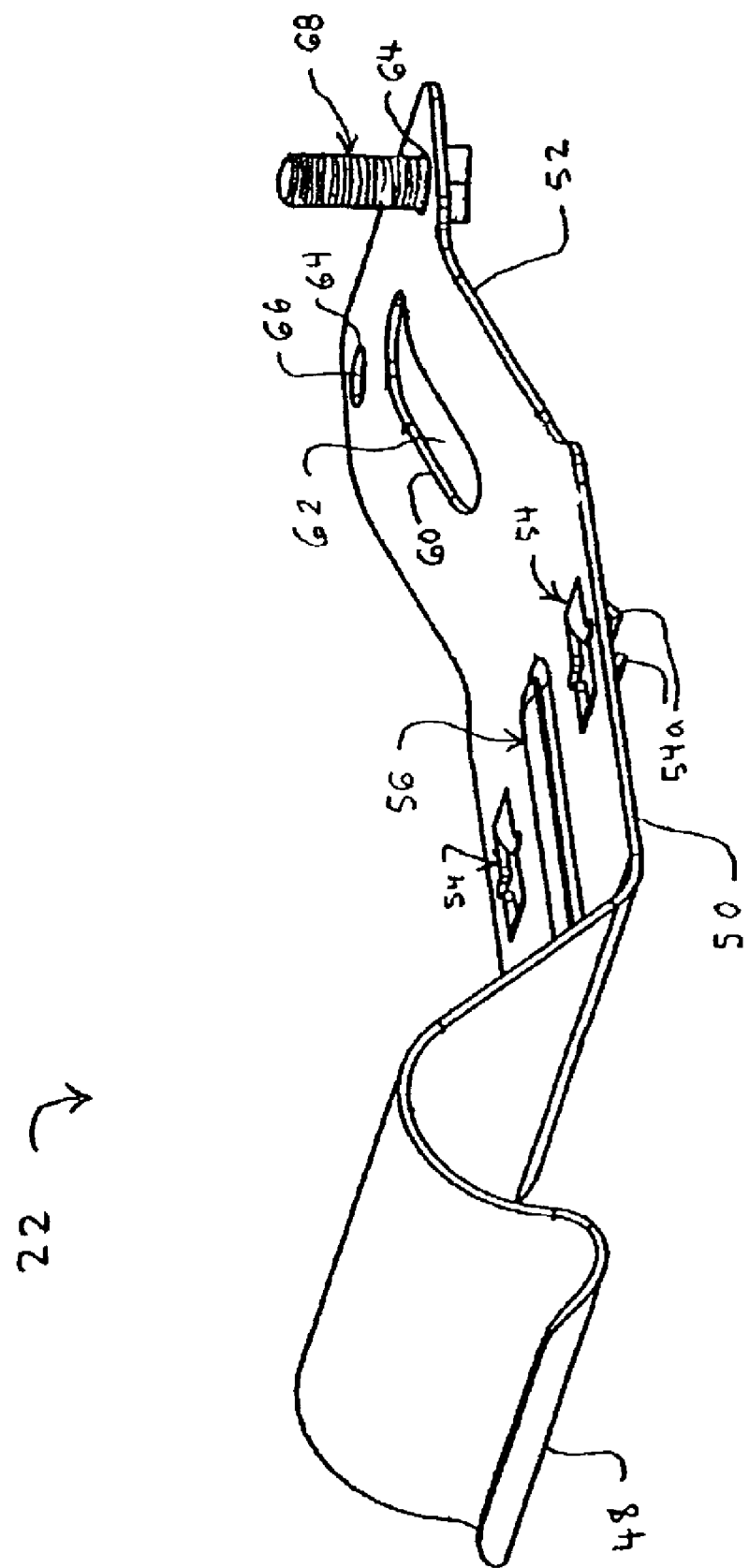
FIG. 6 is an elevated side perspective view of the seat adjust handle in one embodiment of the present invention.
Figure 7:
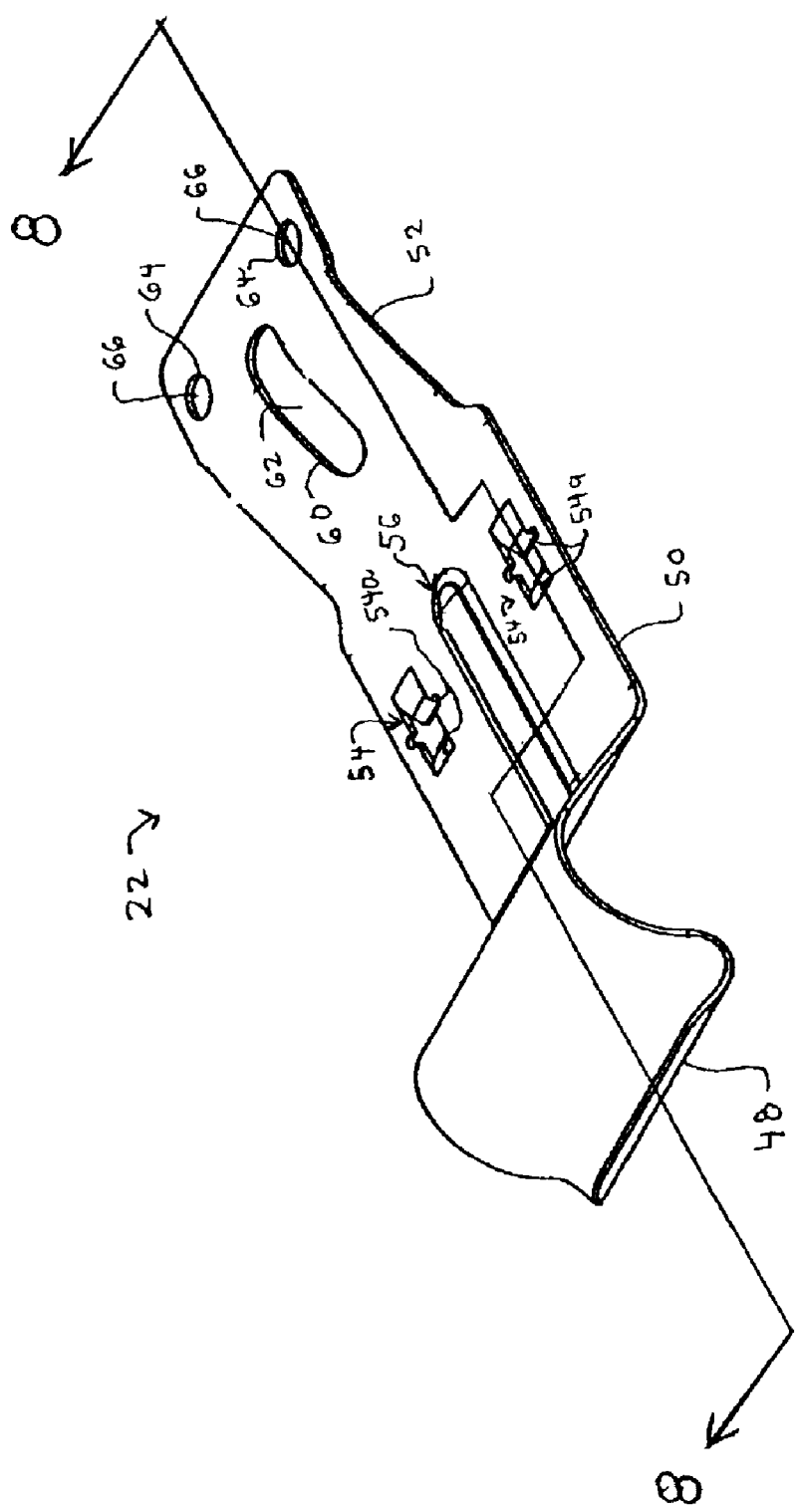
FIG. 7 is a top perspective view of the seat adjust handle in one embodiment of the present invention.
Figure 8:
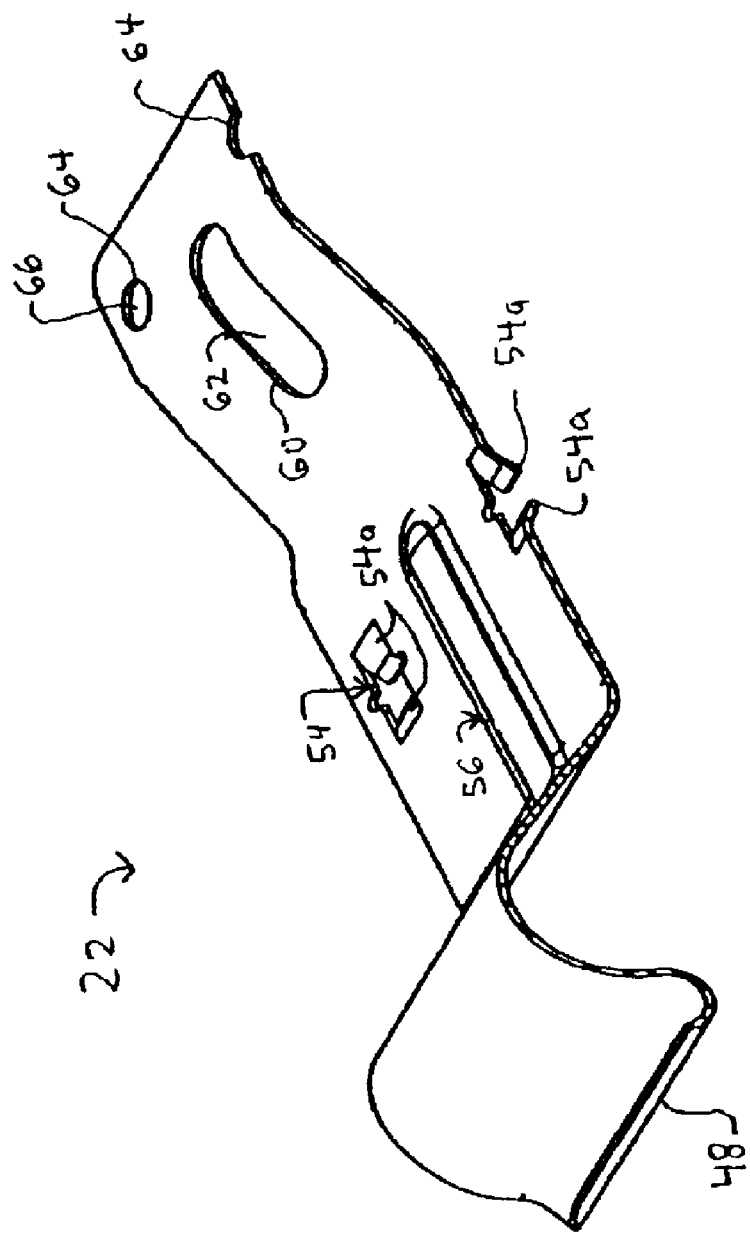
FIG. 8 is cross-sectional view of the seat adjust handle of FIG. 7, taken substantially along line 8—8 of FIG. 7.

As best shown in FIGS. 6 to 8, the seat adjust handle 22, preferably a one-piece or unitary flexible metallic strip, includes: (a) a hand grip member which enables the user to grip the seat adjust handle 22; (b) a body 50 connected to the hand grip member 48; and (c) a seat securing member 52 which connects the seat adjust handle 22 to the seat 12. The body 50 includes at least one and preferably a plurality of seat support engaging members 54 which extend into and mate with slots 35. The seat support engaging members 54 restrain the sliding movement of the seat 12 relative to the seat support 18. It is preferable that each seat support engaging member 54 includes at least one tooth or male member 54a which extends into the slot 35. The male members 54a thus lock the seat 12 in a fixed position.

The body 50 of the seat adjust handle 22 also includes a stiffening member 56 for providing stiffness and rigidity to the seat adjust handle 22. The seat securing member 52 includes a slot wall 60 defining a flexibility slot 62. The flexibility slot 62 provides the seat adjust handle 22 with additional flexibility. In addition, the seat securing member 52 includes a plurality of walls 64 which define openings 66. Bolts 68, one of which is shown in FIG. 6, extend through the openings 66 and secure the seat securing member 52 to the seat 12. As illustrated, the seat adjust handle 22 is preferably connected to the side of the seat 12 versus the front of the seat 12. Accordingly, the seat adjust handle 22 functions as a right hand seat adjust handle (as illustrated) or a left hand seat adjust handle (not shown). Such side positioning of the seat adjust handle facilitates the user's convenient access and operation of the seat adjust handle.

The seat adjust handle 22 is constructed of a flexible material which, when flexed and released, returns to its original shape or substantially original shape. Preferably, the seat adjust handle 22 is preformed with a select downward slope, step or bend configuration. Such downward bend configuration begins at the seat securing member 52. The seat securing member 52 is thus in a plane above the plane of the body 50. It should be appreciated, however, that the seat adjust handle 22 can be substantially or entirely flat. In such case, the seat support 18 and/or the seat 12 could be adapted in shape so that the flat seat adjust handle engages and disengages with the seat support in a spring-like fashion.

In the illustrated embodiment having the downward bend configuration, when the seat securing member 52 is connected to the seat 12, the body 50 of the seat adjust handle 22 applies a spring force to the top surface 18a of the seat support 18. As such, the seat adjust handle 22 functions in a spring-like fashion as a biasing handle, springback handle, biasing member or spring. In operation, the seat adjust handle 22 has an engaged position when in contact with the seat support 18. A user may pull the hand grip member 48 upward to a disengaged position and slide the seat 12 forward or backward. Once the user reaches the desired seat position, the user can release the hand grip member 48. Upon release, the seat adjust handle 22 returns to the engaged position, and the seat support engaging members 54 extend into and engage with the slots 35. At this point, the seat adjust handle 22 locks the seat 12 in place.

The seat adjust handle 22 is preferably constructed of a metallic material, though the seat adjust handle 22 can be constructed of other suitable materials such as any suitable plastic, rubber or any suitable combination of metal, plastic, rubber or any other material. The metallic material preferably has springback properties suitable for undergoing repeated deformation of the seat adjust handle 22 due to the user's upward pulling and releasing of the hand grip 48. Consequently, these properties facilitate the flexing of the seat adjust handle 22 and the return to its original or substantially original position. Accordingly, the seat adjust handle 22 preferably applies substantially the same force to the top surface 18a of the seat support 18 throughout the life of the seat adjust handle 22. This metallic material also has a suitable strength so that the mating members 54a, though relatively small in size, have sufficient strength to restrain the forward and backward movement of the seat during the operation of the tractor 16.

In one embodiment, this metallic material is cold rolled sheet steel produced as a low carbon alloy-free material. Such material has a minimum tensile strength of approximately one hundred ninety thousand pounds per square inch. The composition for such material preferably includes approximately eighteen percent Carbon, forty-five percent Manganese, one percent Phosphorus and one and one-half percent Sulfur.

It should be appreciated that the present invention can include multiple seat adjust handles for providing additional support for restraining the movement of the seat 12 during operation of the tractor. For example, the present invention could include a left seat adjust handle and a right seat adjust handle.

In operation of one embodiment of the present invention, the user sits down on the seat 12 of the tractor 16. While seated, the user pulls the hand grip member 48 upward. Next, the user uses his or her legs to push the seat 12 backward or pull the seat 12 forward. Once the user reaches a desirable seat position, the user releases the hand grip member 48. Preferably, the user releases the hand grip member 48 at such a position so that the seat support engaging members 54 are aligned with the slots 35 of the seat support 18. However, if the user misaligns the seat support engaging members 54, the mating members 54a will abut against the top surface 18a of the seat support 18. The user may then push the seat 12 slightly backward or pull the seat 12 slightly forward until the mating members 54a protrude into and engage with the slots 35. The seat adjust handle 22, constructed of a relatively strong metallic material, maintains the seat 12 in a locked position despite the force of the user's body weight and the rigors of the operating conditions.

In another embodiment not shown, the seat support 18 can be adapted to include one or more engaging members which each include a tooth or protruding member. The seat adjust handle 22 can be adapted to include one or more engaging members, such as slots, which receive the protruding members. In this embodiment, when the seat adjust handle engages with the seat support, the protruding members of the seat support extend into the slots of the seat adjust handle. Likewise, when the seat adjust handle is disengaged from the seat support, the slots of the seat adjust handle are removed from the protruding members of the seat support.

It should be appreciated that the seat mount assembly of the present invention can be installed and used on any tractor, mowing machine, snow plow machine, snow thrower, vacuum machine, cleaning machine, power tool or recreational vehicle which includes a seat for the user.

The present invention, in one embodiment, includes a seat mount assembly which enables users of tractors to adjust the seat position while remaining seated on the tractor. The seat mount assembly includes a seat support, seat securing members connected to the seat and slideably engaged with the seat support and a seat adjust handle or biasing handle which adjustably secures the seat in a desired position. The seat adjust handle functions both as a handle and a spring. This type of seat mount assembly is reliable, requires relatively little or no maintenance and is highly convenient for users.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A seat mount assembly comprising:
at least one seat support supported by a tractor frame of a tractor, the tractor having a seat supported by the tractor frame, the seat having a right side and a left side, the seat support adapted to engage with a plurality of securing members connectable to the seat so that the seat is movable between a plurality of positions relative to the seat support, each of the securing members having a downwardly extending portion, the seat support defining a plurality of slots, each of the slots sized to receive the downwardly extending portion of at least one of the securing members, the seat support having a plurality of walls defining a cavity which spaces the seat apart from the tractor frame, the seat support having a plurality of engaging members positioned adjacent to one side of the seat; and
a single flexible seat adjust handle connectable to either the right side or the left side of the seat, the single flexible seat adjust handle operable to be flexed between one position when the single flexible seat adjust handle is engaged with at least one of the engaging members and at least one other position when the single flexible seat adjust handle is disengaged from the at least one engaging member, wherein the single flexible seat adjust handle has a spring property operable to bias the single flexible seat adjust handle against the seat support, and the single flexible seat adjust handle has a strength sufficient to restrain a movement of the seat during operation of the tractor.

2. The seat mount assembly of claim 1, wherein the single flexible seat adjust handle includes at least one metallic strip.

3. The seat mount assembly of claim 2, wherein the single flexible seat adjust handle is a unitary member.

4. The seat mount assembly of claim 1, wherein each of the engaging members has a slot wall which defines a slot.

5. A seat mount assembly comprising:
  at least one seat support supported by a tractor frame of a tractor, the tractor having a seat supported by the tractor frame, the seat having a right side and a left side, the seat support having at least one guide having a length, the guide adapted to engage with at least one engaging member connected to the seat, the engaging member movable between a plurality of positions along the length, the seat support having a plurality of slot walls which define a plurality of slots, the seat support having a body and a plurality of legs connected to the body; and
  a single flexible seat adjust handle connectable to either the right side or the left side of the seat, the single flexible seat adjust handle having one position when the single flexible seat adjust handle is engaged with at least one of the slot walls and at least one other position when the single flexible seat adjust handle is disengaged from the slot wall, wherein the single flexible seat adjust handle has a spring property operable to bias the single flexible seat adjust handle against the seat support, and the single flexible seat adjust handle has a strength sufficient to restrain a movement of the seat during operation of the tractor.

6. The seat mount assembly of claim 5, wherein the seat support defines a cavity.

7. The seat mount assembly of claim 5, wherein body includes an upper surface, and each of the legs includes a wall extending downwardly from the upper surface.

8. The seat mount assembly of claim 5, wherein the guide has a slot wall which defines a slot having a length.

9. The seat mount assembly of claim 5, wherein the guide has at least one track.

10. The seat mount assembly of claim 5, wherein the engaging member has at least one fastener.

11. The seat mount assembly of claim 5, wherein the slots have a uniformly spaced formation.

12. The seat mount assembly of claim 5, wherein the single flexible seat adjust handle includes at least one metallic strip.

13. The seat mount assembly of claim 5, wherein the single flexible seat adjust handle has at least one seat support engaging member having a strength sufficient to restrain a movement of the seat during operation of the tractor.

14. The seat mount assembly of claim 13, wherein the seat support engaging member has at least one mating member configured to mate with each of the slot walls.

15. A seat mount assembly comprising:
  at least one seat support supported by a tractor frame of a tractor, the tractor having a seat supported by the tractor frame, the seat having a right side and a left side, the seat support having at least one guide having a length, the guide adapted to engage with a first engaging member connected to the seat, the first engaging member movable between a plurality of positions along the length, the seat support having a plurality of second engaging members, the seat support having a body and a plurality of legs connected to the body; and
  a single flexible seat adjust handle connectable to either the right side or the left side of the seat, the single flexible seat adjust handle having at least one slot wall defining a slot, the single flexible seat adjust handle operable to be flexed between one position when the at least one slot wall is engaged with at least one of the second engaging members and at least one other position when the slot wall is disengaged from the at least one second engaging member, wherein the single flexible seat adjust handle has a spring property operable to bias the single flexible seat adjust handle against the seat support, and the single flexible seat adjust handle has a strength sufficient to restrain a movement of the seat during operation of the tractor.

16. The seat mount assembly of claim 15, wherein the seat support defines a cavity.

17. The seat mount assembly of claim 15, wherein each of the legs includes a wall.

18. The seat mount assembly of claim 15, wherein the guide has a slot wall which defines a slot having a length.

19. The seat mount assembly of claim 15, wherein the guide has at least one track.

20. The seat mount assembly of claim 15, wherein the first engaging member has at least one fastener.

21. The seat mount assembly of claim 15, wherein the slots have a uniformly spaced formation.

22. The seat mount assembly of claim 15, wherein the single flexible seat adjust handle includes at least one metallic strip.

23. The seat mount assembly of claim 15, wherein the single flexible seat adjust handle has at least one seat support engaging member having a strength sufficient to restrain a movement of the seat during operation of the tractor.

24. The seat mount assembly of claim 23, wherein the second engaging member has at least one mating member configured to mate with the at least one slot wall.

25. A tractor comprising:
  a tractor frame;
  at least one seat supported by the tractor frame, the seat having a right side and a left side;
  at least one securing member coupled to the seat;
  at least one seat support supported by the tractor frame, the seat support having a body including at least one guide having a length, the seat support having a plurality of legs connected to the body, the guide engaged with the securing member so that the seat is movable alone the length between a plurality of positions relative to the seat support, the seat support having a plurality of engaging members; and
  a single flexible seat adjust handle connectable to either the right side or the left side of the seat, the single flexible seat adjust handle operable to be flexed between one position when the single flexible seat adjust handle is engaged with at least one of the engaging members and at least one other position when the single flexible seat adjust handle is disengaged from the engaging member, wherein the single flexible seat adjust handle has a spring property operable to bias the single flexible seat adjust handle against the seat support, and the single flexible seat adjust handle has a strength sufficient to restrain a movement of the seat during operation of the tractor.

26. The tractor of claim 25, wherein the single flexible seat adjust handle includes at least one metallic strip.

27. The tractor of claim 25, wherein each of the engaging members has a slot wall which defines a slot.

28. A seat mount assembly comprising:

at least one seat support supported by a tractor frame of a tractor, the tractor having a seat supported by the tractor frame, the seat having a plurality of engaging members, the seat support having a top surface defining at least one elongated slot, the seat support having a plurality of walls extending downwardly from the top surface, the walls extending around a perimeter of the seat support, the seat support adapted to engage the seat so that the seat is movable between a plurality of positions relative to the seat support, the seat support having a right side and a left side; and a single flexible seat adjust handle connectable to either the right side or the left side of the seat support, the single flexible seat adjust handle operable to be flexed to one position when the single flexible seat adjust handle is engaged with at least one of the engaging members and at least one other position when the single flexible seat adjust handle is disengaged from the at least one engaging member, wherein the single flexible seat adjust handle has a spring property operable to bias the single flexible seat adjust handle against the seat, and the single flexible seat adjust handle has a strength sufficient to restrain a movement of the seat during operation of the tractor.

29. The seat mount assembly of claim 28, wherein the flexible handle includes at least one metallic strip.

30. The seat mount assembly of claim 28, wherein the flexible handle is a unitary member.

31. The seat mount assembly of claim 28, wherein the flexible handle has at least one handle engaging member which engages with at least one engaging member of the seat, the handle engaging member having a strength sufficient to restrain movement of the seat during operation of the tractor.

32. A seat mount assembly comprising:

a seat support supported by a tractor frame of a tractor, the tractor having a seat supported by the tractor frame, the seat support having a body defining a cavity, the seat support having:

(a) a top surface;

(b) a first slot wall defined by the top surface and a second slot wall defined by the top surface, the first and second slot walls adapted to engage with a plurality of seat securing members which are movable between a plurality of positions along the slot walls;

(c) a plurality of different slot walls defined by the top surface;

(d) a plurality of legs connected to the top surface; and at least one flexible handle connectable to the seat, the flexible handle having one position when the flexible handle is engaged with at least one of the different slot walls and at least one other position when the flexible handle is disengaged from the different slot wall, wherein the flexible handle has a spring property operable to bias the flexible handle against the seat support.

33. The seat mount assembly of claim 32, wherein the legs include walls.

34. The seat mount assembly of claim 32, wherein the seat support has a one-piece construction.

* * * * *